June 2, 1925.

I. C. HOWES

SELF ALIGNING BEARING

Filed Aug. 21, 1924

Inventor.
Irving C. Howes
by Heard Smith & Tennant.
Attys.

Patented June 2, 1925.

1,540,072

UNITED STATES PATENT OFFICE.

IRVING C. HOWES, OF NORTH ANDOVER, MASSACHUSETTS, ASSIGNOR TO DAVIS & FURBER MACHINE COMPANY, OF NORTH ANDOVER, MASSACHUSETTS, A CORPORATION OF MASSACHUSETTS.

SELF-ALIGNING BEARING.

Application filed August 21, 1924. Serial No. 732,259.

*To all whom it may concern:*

Be it known that I, IRVING C. HOWES, a citizen of the United States, and resident of North Andover, county of Essex, State of Massachusetts, have invented an Improvement in Self-Aligning Bearings, of which the following description, in connection with the accompanying drawing, is a specification, like characters on the drawing representing like parts.

This invention relates to shaft bearings and has for its object to provide a self-aligning bearing and also a simple and efficient means for transversely adjusting the bearings.

The invention is particularly applicable for use in connection with shafts which support endless traveling devices such as the tapes of tape condensers.

The object of the invention is to provide a self-aligning bearing for such shafts which will insure that the bearings of each shaft shall always be in proper alignment.

The object of the invention is further to provide a simple and efficient form of construction which shall enable the ready assemblage and disassemblage of the various parts.

The object of the invention is further to provide a form of self-aligning bearing which may be readily adjustable to shift the shaft transversely of the frame.

These and other objects and features of the invention will appear more fully from the accompanying description and drawings and will be particularly pointed out in the claims.

Figure 1:
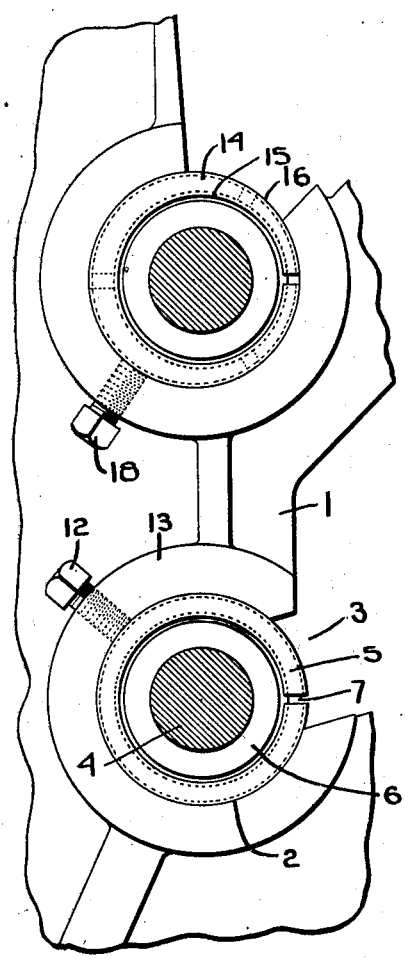
Fig. 1 is a side elevation of a portion of the frame of a machine, such for example as a tape condenser, illustrating two preferred embodiments of the present invention.
Figure 2:
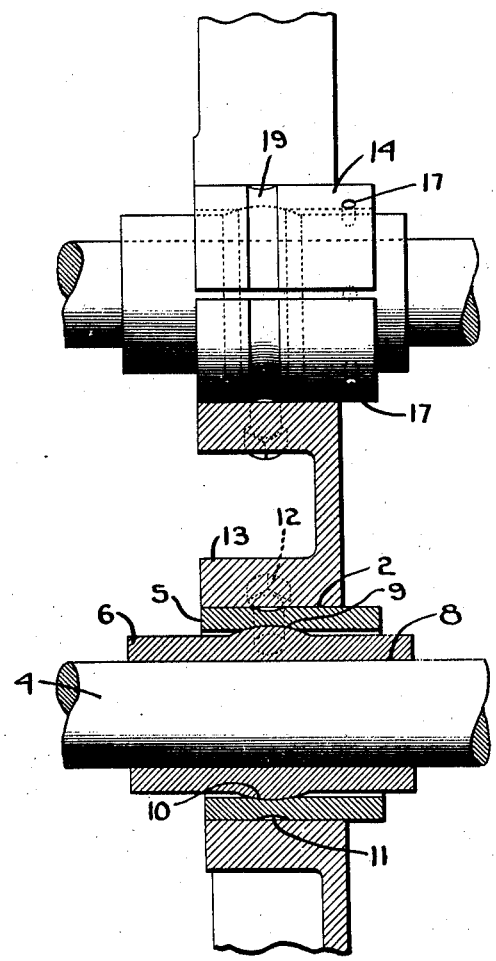
Fig. 2 is a view looking to the right of Fig. 1 with the lower part of the construction shown in vertical cross-section.

The shaft bearing of this invention is adapted for a wide range of uses and is available for use wherever a self-aligning bearing is desirable.

In order to illustrate preferred forms of the invention the bearing is shown as applied to the ends of shafts such as are employed for supporting the tapes in a tape condenser familiar to the textile industry.

As the invention is concerned entirely with the bearing construction, it is unnecessary either to illustrate or describe the machine in which the bearings are located.

In the construction illustrated two forms of bearings embodying the invention are shown differing only in that one of these bearings is constructed to enable the shaft to be adjusted transversely of the frame of the machine.

At the lower portion of the drawing is shown the non-adjustable type of bearing. In the frame 1 is formed a bearing seat 2 preferably presenting a cylindrical surface. This bearing seat is open throughout at 3 and the width of this opening is at least greater than the diameter of the shaft 4 to enable the shaft to be placed transversely in the seat.

The bearing construction between the shaft and the seat comprises essentially two elements, namely a longitudinally split sleeve 5 and a bearing sleeve 6.

The sleeve 5 at its exterior surface snugly fits the bearing seat, and when, as illustrated, the bearing seat is cylindrical, the exterior surface of the split sleeve is therefore also cylindrical. This sleeve 5 is split longitudinally at 7 and the sleeve is of such thickness and dimensions that it may be sprung slightly.

The bearing sleeve 6 is of substantially less external diameter than the internal diameter of the sleeve 5 and is provided with a bore 8 fitting the shaft 4.

The split sleeve 5 is provided midway its ends with a concave spherical zonal socket section 9 in its inner surface and the bearing sleeve 6 is provided on its exterior surface with a corresponding convex spherical zonal ball section 10.

In assembling the bearing the split sleeve 5 is slipped endwise over the bearing sleeve 6 and sprung at the split 7 to permit the ball section 10 to enter the socket section 9 and then the two interengaged sleeves are slipped endwise into the bearing seat 2. The opening 3 in the bearing seat enables the bearing sleeve 6 and split sleeve 5 to be thus assembled without moving the shaft 4 endwise from the machine.

The split sleeve 5 is preferably provided with an external circumferential groove 11 and a set screw 12 threaded through the wall 13 of the bearing seat abuts the sleeve 5 in this groove 11 and locks the sleeve 5 firmly in place preventing either rotary or longitudinal movement of the sleeve.

The construction of the bearing shown in the upper portion of the drawing is the same in all respects except that the spilt sleeve 14 has its interior surface 15 formed eccentric to its exterior surface 16. Consequently a rotary adjustment of the split sleeve 14 in its bearing seat serves to shift the bearing sleeve and shaft transversely of the frame, To enable this rotary adjustment readily to be made the split sleeve 14 is provided with radial holes 17 in a portion of the sleeve projecting beyond the machine frame thus providing for the use of a spanner or similar device.

The same locking means as heretofore described; namely, a set screw 18 entering the groove 19 of the sleeve, is shown for locking the sleeve in its adjusted position.

It will thus be seen that the bearing sleeve 6 will, under all conditions, be automatically self-aligning owing to the ball and socket connection with the split sleeve. Thus no strain due to misalignment of the bearings at opposite ends of the shaft can take place. It will also be seen that the construction provides a simple and efficient means for assembling and disassembling the parts and furthermore, in the eccentric form, a simple and efficient means for adjusting the shaft transversely of the frame.

Having thus described the invention, what is claimed as new, and desired to be secured by Letters Patent, is:

1. A self-aligning shaft bearing comprising a frame and a cylindrical seat, a longitudinally split sleeve fitting the bearing seat and having a concave, spherical, zonal socket section in its interior surface, and a bearing sleeve having its bore fitting the shaft and having a convex, spherical, zonal ball section on its exterior surface fitting the socket section, whereby when the bearing sleeve and the split sleeve are fitted together, they may be slipped endwise into the cylindrical bearing seat.

2. A self-aligning shaft bearing comprising the construction defined in claim 1 in which the exterior surface of the split sleeve and the surface of the bearing seat are cylindrical and in which the interior surface of the split sleeve is eccentric to the exterior surface, thus enabling rotary adjustment of the split sleeve in the bearing seat to effect transverse adjustment of the shaft relatively to the frame and means for locking the split sleeve in adjusted position.

3. A self-aligning shaft bearing comprising the construction defined in claim 1 in which the exterior surface of the split sleeve and the surface of the bearing seat are cylindrical and in which the interior surface of the split sleeve is eccentric to the exterior surface thus enabling rotary adjustment of the split sleeve in the bearing seat to effect transverse adjustment of the shaft relatively to the frame and in which a circumferential groove is provided in the exterior surface of the split sleeve and a set screw extends through the bearing seat and abuts the split sleeve in said groove to lock the split sleeve in adjusted position.

4. A self-aligning shaft bearing comprising the construction defined in claim 1 in which a circumferential groove is provided in the exterior surface of the split sleeve and in which a set screw extends through the bearing seat and abuts the split sleeve in said groove to lock the split sleeve in the seat independently of the rotary position of the said split sleeve.

In testimony whereof, I have signed my name to this specification,

IRVING C. HOWES.